US008023883B1

(12) United States Patent
Lee et al.

(10) Patent No.: US 8,023,883 B1
(45) Date of Patent: Sep. 20, 2011

(54) METHOD AND APPARATUS FOR CONTROLLING HANDOFFS IN A MOBILE SYSTEM

(75) Inventors: Sean S. Lee, Rockville, MD (US); Kevin Lilly, Falls Church, VA (US); Yonghong Zhao, Gaithersburg, MD (US); Scott D. Casavant, Germantown, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 1265 days.

(21) Appl. No.: 11/320,318

(22) Filed: Dec. 28, 2005

(51) Int. Cl.
*H04B 7/185* (2006.01)
*H04W 4/00* (2009.01)
*H04W 36/00* (2009.01)
*H04N 5/46* (2006.01)
*H04N 5/50* (2006.01)
*H04N 7/10* (2006.01)
*H04N 7/20* (2006.01)
*G06Q 30/00* (2006.01)
*G06F 15/16* (2006.01)

(52) U.S. Cl. .................. 455/3.02; 455/12.1; 455/422.1; 455/436; 455/440; 348/729; 348/731; 705/14.69; 705/27.1; 709/218; 709/230; 725/32; 725/63

(58) Field of Classification Search ................ 455/3.02, 455/3.05, 3.06, 11.1, 12.1, 13.2, 73, 427, 455/428, 429, 430, 550.1, 552.1, 553, 554.1, 455/561, 436, 439, 440, 442, 443, 444, 448, 455/45, 56.2, 456.6, 419, 422.1, 432.1, 432.2, 455/437, 452.2, 456.1, 456.3, 404.2, 414.2, 455/413.1, 436.4, 457, 13.1, 13.3; 705/10, 705/14, 35; 725/32–36, 63–72, 75, 105; 735/240.24; 709/201, 203, 207, 217, 219, 709/225, 227, 228, 229, 231, 236; 348/461, 348/473, 465, 731, 837, 838; 370/328, 331, 370/412, 431
See application file for complete search history.

(56) References Cited

U.S. PATENT DOCUMENTS

| 3,860,746 A | 1/1975 | Takeuchi |
| 3,993,955 A | 11/1976 | Belcher et al. |
| 4,155,042 A | 5/1979 | Permut et al. |
| 4,390,904 A | 6/1983 | Johnston et al. |
| 5,070,404 A | 12/1991 | Bullock et al. |

(Continued)

FOREIGN PATENT DOCUMENTS

EP 0831606 A2 3/1998

(Continued)

OTHER PUBLICATIONS

Zhang, Yanchao; Liu, Wei; Fang, Yuguang; "Secure Localization in Wireless Sensor Networks"; IEEE Military Communications Conference; Oct. 2005; pp. 3169-3175; vol. 5.

(Continued)

*Primary Examiner* — Nay Maung
*Assistant Examiner* — Paul P Tran

(57) ABSTRACT

A method of operating a mobile device includes determining a location of the mobile device, determining a local market area for the mobile device in response to the location. The method further includes broadcasting a local market signal for a first network in a first market and a second local market signal for the first network in a first market. The mobile device selects one of the first local market signal and the second local market signal in response to the local market for the mobile device.

35 Claims, 8 Drawing Sheets

U.S. PATENT DOCUMENTS

| | | | |
|---|---|---|---|
| 5,121,430 | A | 6/1992 | Ganzer et al. |
| 5,214,622 | A | 5/1993 | Nemoto et al. |
| 5,260,778 | A | 11/1993 | Kauffman et al. |
| 5,388,101 | A | 2/1995 | Dinkins |
| 5,410,728 | A | 4/1995 | Bertiger et al. |
| 5,432,542 | A | 7/1995 | Thibadeau et al. |
| 5,448,623 | A | 9/1995 | Wiedeman et al. |
| 5,491,717 | A | 2/1996 | Hall |
| 5,512,935 | A | 4/1996 | Majeti et al. |
| 5,565,909 | A | 10/1996 | Thibadeau et al. |
| 5,574,968 | A | 11/1996 | Olds et al. |
| 5,585,858 | A | 12/1996 | Harper et al. |
| 5,625,867 | A | 4/1997 | Rouffet et al. |
| 5,625,868 | A | 4/1997 | Jan et al. |
| 5,636,245 | A | 6/1997 | Ernst et al. |
| 5,659,366 | A | 8/1997 | Kerman |
| 5,664,948 | A | 9/1997 | Dimitriadis et al. |
| 5,701,161 | A | 12/1997 | Williams et al. |
| 5,760,820 | A | 6/1998 | Eda et al. |
| 5,825,407 | A | 10/1998 | Cowe et al. |
| 5,826,188 | A | 10/1998 | Tayloe et al. |
| 5,826,190 | A | 10/1998 | Krutz et al. |
| 5,838,277 | A | 11/1998 | Loomis et al. |
| 5,850,218 | A | 12/1998 | LaJoie et al. |
| 5,920,804 | A | 7/1999 | Armbruster et al. |
| 6,005,605 | A | 12/1999 | Kostreski et al. |
| 6,020,913 | A | 2/2000 | Bush et al. |
| 6,029,045 | A | 2/2000 | Picco et al. |
| 6,115,667 | A | 9/2000 | Nakamura |
| 6,119,065 | A | 9/2000 | Shimada et al. |
| 6,140,943 | A | 10/2000 | Levine |
| 6,205,582 | B1 | 3/2001 | Hoarty |
| 6,233,451 | B1 | 5/2001 | Noerpel et al. |
| 6,240,369 | B1 | 5/2001 | Foust |
| 6,266,816 | B1 | 7/2001 | Watson et al. |
| 6,334,059 | B1 | 12/2001 | Stilp et al. |
| 6,340,997 | B1 | 1/2002 | Borseth |
| 6,362,778 | B2 | 3/2002 | Neher |
| 6,396,537 | B1 | 5/2002 | Squilla et al. |
| 6,400,941 | B1 | 6/2002 | Nara |
| 6,424,840 | B1 * | 7/2002 | Fitch et al. ................. 455/456.1 |
| 6,509,908 | B1 | 1/2003 | Croy et al. |
| 6,529,742 | B1 | 3/2003 | Yang |
| 6,543,051 | B1 | 4/2003 | Manson et al. |
| 6,546,246 | B1 | 4/2003 | Bridges et al. |
| 6,552,661 | B1 | 4/2003 | Lastinger et al. |
| 6,553,232 | B1 * | 4/2003 | Shaffer et al. ................. 455/440 |
| 6,571,096 | B2 | 5/2003 | Plunkett |
| 6,636,272 | B1 | 10/2003 | Noguchi et al. |
| 6,698,020 | B1 | 2/2004 | Zigmond et al. |
| 6,704,931 | B1 | 3/2004 | Schaffer et al. |
| 6,728,967 | B2 | 4/2004 | Bennington et al. |
| 6,772,433 | B1 | 8/2004 | La Joie et al. |
| 6,782,392 | B1 | 8/2004 | Weinberger et al. |
| 6,785,551 | B1 | 8/2004 | Richard |
| 6,806,830 | B2 | 10/2004 | Panasik et al. |
| 6,907,245 | B2 * | 6/2005 | Ohlsson et al. ............... 455/442 |
| 6,952,574 | B2 | 10/2005 | Tealdi et al. |
| 6,968,206 | B1 | 11/2005 | Whitsey-Anderson |
| 7,034,695 | B2 | 4/2006 | Troxler |
| 7,035,321 | B2 | 4/2006 | Balaberda |
| 7,039,393 | B1 | 5/2006 | Kite |
| 7,107,046 | B1 | 9/2006 | Mainard et al. |
| 7,130,610 | B2 | 10/2006 | Dolezal et al. |
| 7,164,986 | B2 | 1/2007 | Humphries et al. |
| 7,174,308 | B2 | 2/2007 | Bergman et al. |
| 7,206,610 | B2 | 4/2007 | Iacono et al. |
| 7,209,739 | B2 | 4/2007 | Narayanabhatla |
| 7,233,781 | B2 | 6/2007 | Hunter et al. |
| 7,248,872 | B2 | 7/2007 | Bassett et al. |
| 7,251,318 | B1 | 7/2007 | Henderson |
| 7,317,927 | B2 | 1/2008 | Staton et al. |
| 7,319,386 | B2 | 1/2008 | Colllins et al. |
| 7,333,818 | B2 | 2/2008 | Dunn |
| 7,359,724 | B2 | 4/2008 | Torvinen |
| 7,362,952 | B2 | 4/2008 | Katagishi et al. |
| 7,421,724 | B2 | 9/2008 | Klosterman et al. |
| 7,424,286 | B2 | 9/2008 | Okada |
| 7,460,883 | B1 | 12/2008 | McBrearty et al. |
| 7,489,939 | B2 | 2/2009 | Ashley et al. |
| 7,522,556 | B2 | 4/2009 | Hanna et al. |
| 7,548,747 | B2 | 6/2009 | Yang |
| 7,558,558 | B2 | 7/2009 | Langsenkamp et al. |
| 7,593,689 | B2 | 9/2009 | Allen et al. |
| 7,684,782 | B2 | 3/2010 | Ashley et al. |
| 7,714,778 | B2 | 5/2010 | Dupray |
| 7,720,431 | B2 | 5/2010 | Lee |
| 7,788,294 | B2 | 8/2010 | Van Wart et al. |
| 7,859,392 | B2 | 12/2010 | McClellan et al. |
| 7,876,205 | B2 | 1/2011 | Catten et al. |
| 7,899,610 | B2 | 3/2011 | McClellan |
| 2002/0028682 | A1 | 3/2002 | Fitch et al. |
| 2002/0042276 | A1 | 4/2002 | Hakalin et al. |
| 2002/0060747 | A1 | 5/2002 | Nonomura |
| 2002/0072361 | A1 | 6/2002 | Knoblach et al. |
| 2002/0100043 | A1 | 7/2002 | Lowthert et al. |
| 2002/0106987 | A1 * | 8/2002 | Linden .......................... 455/12.1 |
| 2002/0124252 | A1 | 9/2002 | Schaefer et al. |
| 2002/0151327 | A1 | 10/2002 | Levitt |
| 2002/0161633 | A1 | 10/2002 | Jacob et al. |
| 2002/0167442 | A1 | 11/2002 | Taylor |
| 2002/0167965 | A1 | 11/2002 | Beasley et al. |
| 2003/0008656 | A1 | 1/2003 | Yamashita et al. |
| 2003/0054809 | A1 | 3/2003 | Bridges et al. |
| 2003/0066078 | A1 | 4/2003 | Bjorgan et al. |
| 2003/0069648 | A1 | 4/2003 | Douglas et al. |
| 2003/0100307 | A1 * | 5/2003 | Wolochow et al. ........... 455/440 |
| 2003/0139175 | A1 | 7/2003 | Kim |
| 2003/0148771 | A1 | 8/2003 | de Verteuil |
| 2003/0181160 | A1 | 9/2003 | Hirsch |
| 2003/0188113 | A1 | 10/2003 | Grawrock et al. |
| 2003/0211827 | A1 | 11/2003 | Yonezawa et al. |
| 2003/0217362 | A1 | 11/2003 | Summers et al. |
| 2003/0221191 | A1 | 11/2003 | Khusheim |
| 2004/0019900 | A1 | 1/2004 | Knightbridge et al. |
| 2004/0095992 | A1 | 5/2004 | Balaberda |
| 2004/0125769 | A1 * | 7/2004 | Vare .............................. 370/331 |
| 2004/0128065 | A1 | 7/2004 | Taylor et al. |
| 2004/0128682 | A1 | 7/2004 | Liga et al. |
| 2004/0137938 | A1 | 7/2004 | Deubler, Jr. |
| 2004/0147221 | A1 | 7/2004 | Sheynblat et al. |
| 2004/0156097 | A1 | 8/2004 | Roper et al. |
| 2004/0198217 | A1 * | 10/2004 | Lee et al. ..................... 455/3.01 |
| 2004/0205829 | A1 * | 10/2004 | Hane, III ....................... 725/135 |
| 2004/0219932 | A1 | 11/2004 | Verteuil |
| 2004/0244035 | A1 * | 12/2004 | Wright et al. ................... 725/32 |
| 2005/0025089 | A1 | 2/2005 | Walker et al. |
| 2005/0055729 | A1 | 3/2005 | Atad et al. |
| 2005/0101314 | A1 | 5/2005 | Levi |
| 2005/0104797 | A1 | 5/2005 | McCollum |
| 2005/0118949 | A1 | 6/2005 | Allen et al. |
| 2005/0143005 | A1 | 6/2005 | Moore |
| 2005/0146429 | A1 | 7/2005 | Spoltore et al. |
| 2005/0154531 | A1 | 7/2005 | Kelly et al. |
| 2005/0176368 | A1 | 8/2005 | Young et al. |
| 2005/0182932 | A1 | 8/2005 | Wheeler |
| 2005/0186931 | A1 | 8/2005 | Laiho et al. |
| 2005/0200555 | A1 | 9/2005 | McCollum |
| 2005/0203927 | A1 | 9/2005 | Sull et al. |
| 2005/0232194 | A1 | 10/2005 | Hanna et al. |
| 2005/0235310 | A1 | 10/2005 | Bies |
| 2005/0255889 | A1 | 11/2005 | Haseba et al. |
| 2005/0272368 | A1 | 12/2005 | Langsenkamp et al. |
| 2005/0272412 | A1 | 12/2005 | Langsenkamp et al. |
| 2006/0023848 | A1 | 2/2006 | Mohler et al. |
| 2006/0034351 | A1 | 2/2006 | Kellett et al. |
| 2006/0063559 | A1 * | 3/2006 | Fruit et al. ................... 455/552.1 |
| 2006/0085310 | A1 * | 4/2006 | Mylet et al. ...................... 705/35 |
| 2006/0105771 | A1 | 5/2006 | Iacono et al. |
| 2006/0111109 | A1 * | 5/2006 | Kim .............................. 455/436 |
| 2006/0130100 | A1 | 6/2006 | Pentland |
| 2006/0205344 | A1 | 9/2006 | Roper et al. |
| 2006/0211437 | A1 | 9/2006 | Yang |
| 2007/0060171 | A1 | 3/2007 | Sudit et al. |
| 2007/0113243 | A1 | 5/2007 | Brey |
| 2007/0146200 | A1 | 6/2007 | Norin et al. |
| 2007/0149167 | A1 | 6/2007 | Lee |

| | | | |
|---|---|---|---|
| 2007/0149218 | A1 | 6/2007 | Lee |
| 2007/0149219 | A1 | 6/2007 | Lee et al. |
| 2007/0150918 | A1* | 6/2007 | Carpenter et al. ............... 725/25 |
| 2007/0176792 | A1 | 8/2007 | Butzer et al. |
| 2007/0191063 | A1 | 8/2007 | Iacono et al. |
| 2008/0015771 | A1 | 1/2008 | Breed et al. |
| 2008/0195469 | A1 | 8/2008 | Toneguzzo |
| 2008/0212500 | A1 | 9/2008 | Zhen et al. |
| 2008/0212502 | A1 | 9/2008 | Zhen et al. |
| 2008/0301727 | A1 | 12/2008 | Cristofalo et al. |
| 2008/0311994 | A1 | 12/2008 | Amaitis et al. |
| 2009/0215445 | A1 | 8/2009 | Yang |
| 2010/0191824 | A1 | 7/2010 | Lindsay |
| 2011/0065458 | A1 | 3/2011 | Staton et al. |

FOREIGN PATENT DOCUMENTS

| | | |
|---|---|---|
| FR | 2789246 | 8/2000 |
| GB | 2344009 | 5/2000 |
| WO | WO 93/94017 | 11/2003 |
| WO | WO 2004/023748 | 3/2004 |
| WO | WO 2006072825 A1 * | 7/2006 |

OTHER PUBLICATIONS

Microsoft Computer Dictionary, Fourth Edition, 1999; pp. 403-404.
U.S. Appl. No. 09/964,231, Filed Sep. 26, 2001, Curtis et al.
Final Rejection dated Nov. 19, 2008 in U.S. Appl. No. 11/319,673, filed Dec. 28, 2005 by Sean S. Lee et al.
Advisory Action dated Jan. 30, 2009 in U.S. Appl. No. 11/319,673, filed Dec. 28, 2005 by Sean S. Lee et al.
Non-final Office Action dated Mar. 4, 2009 in U.S. Appl. No. 11/443,787, filed May 31, 2006 by Sean S. Lee.
Non-final Office Action dated Apr. 29, 2009 in U.S. Appl. No. 11/319,673, filed Dec. 28, 2005 by Sean S. Lee et al.
Final Rejection dated Nov. 24, 2009 in U.S. Appl. No. 11/319,673, filed Dec. 28, 2005 by Sean S. Lee et al.
Final Rejection dated Sep. 15, 2009 in U.S. Appl. No. 11/443,787, filed May 31, 2006 by Sean S. Lee.
Non-final Office Action dated Oct. 9, 2009 in U.S. Appl. No. 11/545,278, filed Oct. 10, 2006 by Sean S. Lee et al.
Final Rejection dated Jan. 13, 2011 in U.S. Appl. No. 11/545,278, filed Oct. 10, 2006 by Sean S. Lee et al.
Final Rejection dated Mar. 4, 2011 in U.S. Appl. No. 11/825,263, filed Jul. 5, 2007 by Georgann S. Grunebach et al.
Non-final Office action dated Sep. 7, 2010 in U.S. Appl. No. 11/545,278, filed Oct. 10, 2006 by Sean S. Lee et al.
Non-final Office action dated Oct. 6, 2010 in U.S. Appl. No. 11/825,263, filed Jul. 5, 2007 by Georgann S. Grunebach et al.
Final Rejection dated Sep. 15, 2010 in U.S. Appl. No. 11/443,787, filed May 31, 2006 by Sean S. Lee.
Non-final Office action dated Feb. 19, 2010 in U.S. Appl. No. 11/545,278, filed Oct. 10, 2006 by Sean S. Lee et al.
Non-final Office Action dated May 19, 2008 in U.S. Appl. No. 11/319,673, filed Dec. 28, 2005 by Sean S. Lee et al.
Non-final Office Action dated Mar. 18, 2010 in U.S. Appl. No. 11/443,787, filed May 31, 2006 by Sean S. Lee.
Non-final Office action dated May 10, 2011 in U.S. Appl. No. 11/545,278, filed Oct. 10, 2006 by Sean S. Lee et al.

* cited by examiner

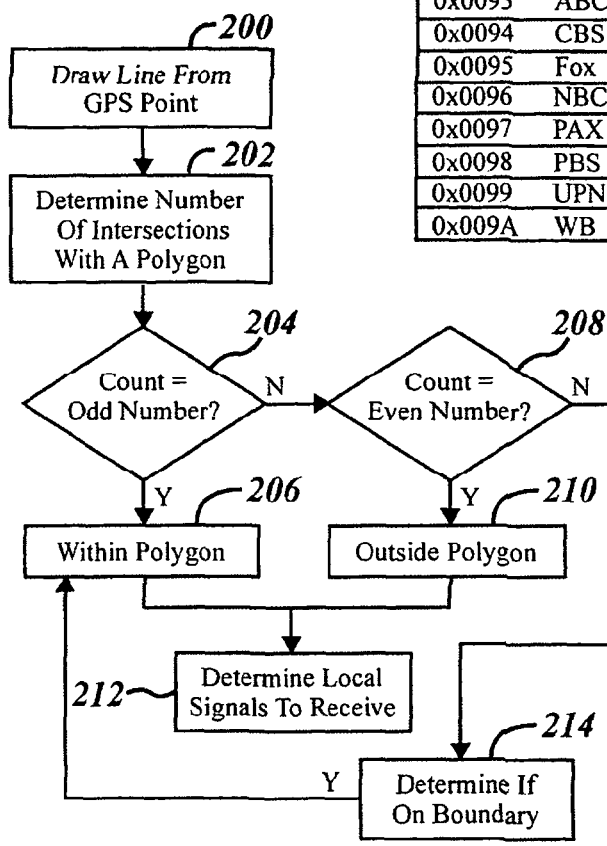
| Entries Initially Under "Major Networks" | | | |
|---|---|---|---|
| Index | Label | Local | Interpretation |
| 0x0093 | ABC | xx | The Network |
| 0x0094 | CBS | xx | The Network |
| 0x0095 | Fox | xx | The Network |
| 0x0096 | NBC | xx | The Network |
| 0x0097 | PAX | xx | The Network |
| 0x0098 | PBS | xx | The Network |
| 0x0099 | UPN | xx | The Network |
| 0x009A | WB | xx | The Network |
*FIG. 12*
*FIG. 11*
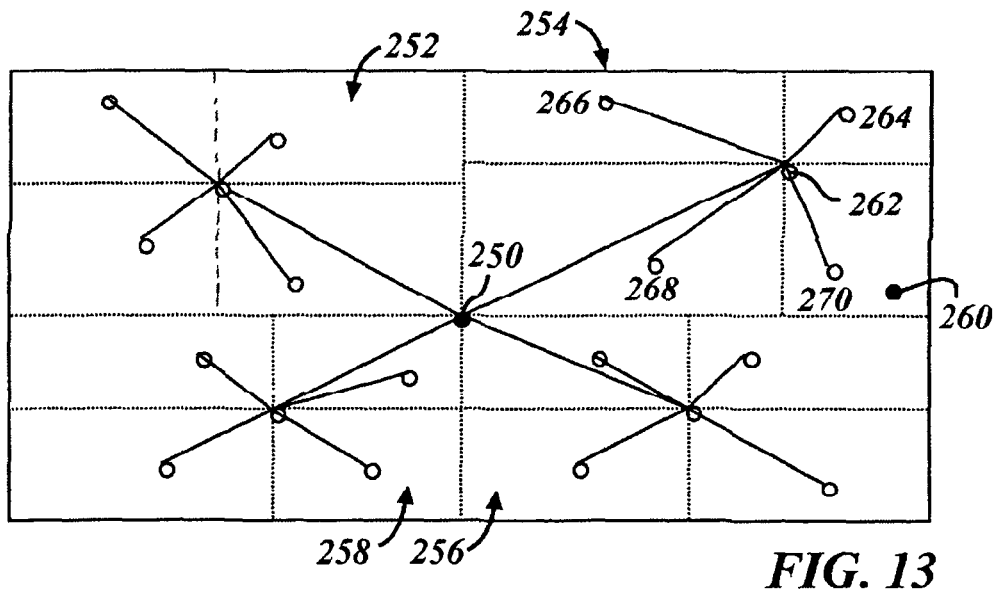
*FIG. 13*

METHOD AND APPARATUS FOR CONTROLLING HANDOFFS IN A MOBILE SYSTEM

TECHNICAL FIELD

The present invention relates generally to satellite television broadcasting, and more specifically, to a method for controlling the local channels displayed according to designated market areas for a mobile satellite receiving unit.

BACKGROUND

Satellite television has become increasingly popular due to its wide variety of programming. Entertainment in automobiles such as DVD players has also become increasingly popular. It would be desirable to provide a satellite television system for a vehicle so that the wide variety of programming may be enjoyed by the rear passengers.

Federal regulations have specific boundaries that set forth where satellite systems rebroadcasted local channels are allowed to be displayed. A satellite system located within one boundary may only display video for all channels associated with that region. Current satellite systems do not include a means for determining a location. The determination of regions is complex. Some overlap, some do not intersect, some are direct adjacent.

It would therefore be desirable to provide a system that allows a mobile satellite system to comply with federal regulations for rebroadcasting local channels.

SUMMARY OF THE INVENTION

The present invention provides a method of operating a satellite television broadcasting system that takes into consideration the location of the mobile receiving device in the tuning of the device.

In one aspect of the invention, a method of operating a mobile device includes determining a location of the mobile device, determining a local television market area for the mobile device, broadcasting a first local television signal for a first network in a first market, and a second local television signal for the first network in a second market, and selecting one of the first local television signal and the second local television signal in response to the location.

In a further aspect of the invention, a method of operating a mobile device comprises determining a local television market, determining a local channel is present but not carried by the satellite, and when a local satellite channel does not exist in the local television market but a local channel is present blocking a network feed on the mobile device.

In yet another aspect of the invention, a method of operating a mobile device includes defining a first area corresponding to a first local market and a second area corresponding to a second local market and an overlapping area of the first local market and the second local market. The method further includes moving a mobile device into a first area outside the overlapping area, tuning the device to a first local television signal and moving the device to the overlapping area from the first area.

The method further includes maintaining the tuning of the device to the first local television signal, moving the mobile device from the overlapping area into the second area outside the overlapping area and when the mobile device is in the second area outside the overlapping area, tuning the device to the second local television signal.

The method may take into consideration a global positioning system or other location device such as a cellular tower-based system when locating is performed.

One advantage of the invention is that federal regulations may now be met for mobile satellite television systems. That is, local channels may be coordinated so that they are provided to the system for display in the proper designated marketing area.

Other advantages and features of the present invention will become apparent when viewed in light of the detailed description of the preferred embodiment when taken in conjunction with the attached drawings and appended claims.

BRIEF DESCRIPTION OF THE DRAWINGS

FIG. 11 is a flow chart illustrating a point inclusion detection algorithm.

FIG. 12 is a chart illustrating a formatting technique for satellite channels.

FIG. 13 is a plot of an alternative inclusion detection determination.

DETAILED DESCRIPTION

Figure 1:
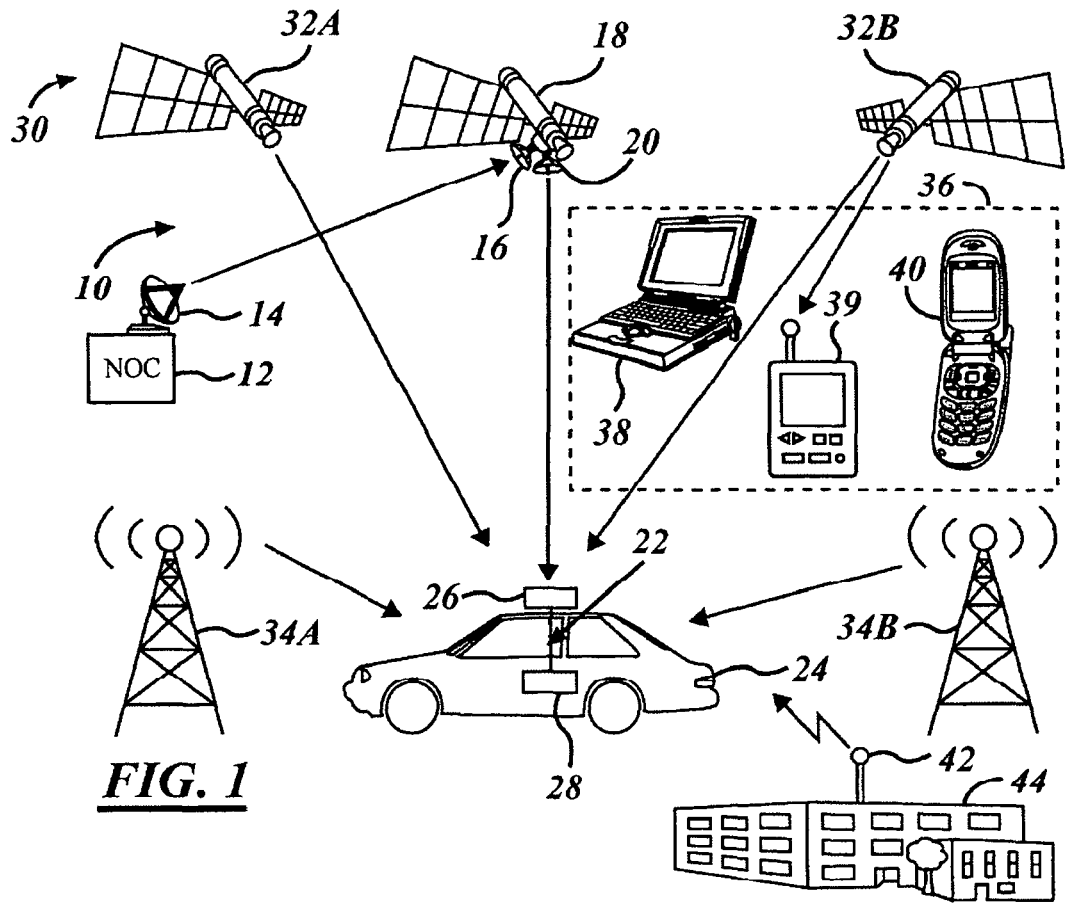
FIG. 1 is a system level view of a satellite broadcasting system according to the present invention.

In the following figures the same reference numerals will be used for the same views. The following figures are described with respect to a mobile satellite television system for use in a vehicle. However, those skilled in the art will recognize the teachings of the present invention may be applied to various types of mobile data reception including terrestrial-based type systems used within a vehicle or other mobile device.

Referring now to FIG. 1, a satellite television broadcasting system 10 is illustrated. The satellite television broadcasting system 10 includes a network operations center 12 that generates wireless signals through a transmitting antenna 14 which are received by a receiving antenna 16 of a satellite 18. The wireless signals, for example, may be digital. A transmitting antenna 20 generates signals directed to various receiving systems including stationary systems such as those in the home as well as mobile receiving systems 22. The wireless signals may have various types of information associated with them including location information. The wireless signals may also have various video and audio information associated therewith. As illustrated, the mobile receiving system 22 is disposed within an automotive vehicle 24. Of course, this is just one example of a mobile receiving device. A receiving antenna 26 receives the wireless signals from the satellite 18 and processes the signals in a mobile receiving unit 28. The mobile receiving unit 28 will be further described below.

The system 10 may also receive location signals from a global positioning system (GPS) 30 that includes a first satellite 32A and a second satellite 32B. Although only two satellites are shown, a typical GPS system includes several satellites, several of which may be in view at any particular time. Triangulation techniques may be used to determine the elevation, latitude and longitude of the system. A locating system may also include cellular towers 34A and 34B that may be used by the mobile receiving system 22 to determine a location. Cellular phones typically include a GPS locating system. As the vehicle 24 moves about, the exact coordinates in latitude and longitude may be used to determine proper local channel broadcast to display.

The present invention may also be used for displaying various wireless information on a personal mobile device 36 such as a laptop computer 38, a personal digital assistant 39, and a cellular telephone 40. It should be noted that these devices and the automotive-based devices may also receive wireless signals having various types of information associated therewith from the cellular towers 34A and 34B. Other types of information may be broadcast from various other types of broadcasting areas such as an antenna 42 on a building 44. The building 44 may be various types of buildings such as a store and the wireless information transmitted from the antenna 42 may be advertising information. All of the wireless signals preferably include location information transmitted therewith. As will be described below, the information may be coded digitally into the signals. Thus, by reviewing the location information, signals appropriate for the location of the mobile devices may be displayed on the various devices. This will be further described below.

Figure 2:
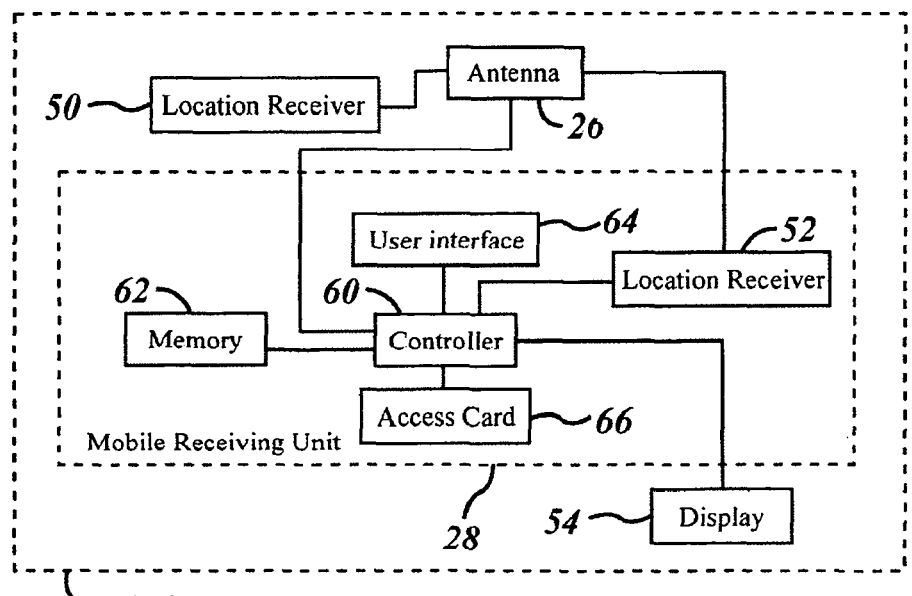
FIG. 2 is a block diagrammatic view of a vehicle having a receiving system according to the present invention.

Referring now to FIG. 2, a receiving unit 22 is illustrated in further detail. Antenna 26 may be various types of antennas including a rotating antenna which is used to track the relative movement of the satellite with respect to the vehicle. The antenna 26 may be a single antenna used for satellite television reception, or a number of antennas such as one for receiving television signals and one coupled to a GPS receiver 50. The antenna 26 may also be an electronic antenna.

The mobile receiving unit 28 is coupled to antenna 26. The mobile receiving unit 28 may also include a location receiver 52 integrated therein. The location receiver 52 may be a GPS receiver. In a preferred embodiment, only one location receiver 50, 52 may be provided in the system. However, the location receiver 50, 52 may be part of the vehicle 24 or may be part of the mobile receiving system 22, 36. The controller 60 may be coupled directly to GPS receiver 52 and/or GPS receiver 50. The mobile receiving unit 28 includes a display 54. The display 54 may be incorporated into the device 36 or within the vehicle 24.

A controller 60 that is microprocessor-based may be used to control the various functions of the receiving unit 28. Such functions include acting as a tuner, receiver, decoder, buffer and other functions. The controller may be similar to that found in current DirecTV set top boxes which employ a chip-based multifunctional controller. The controller 60 may include or be coupled to a memory 62. Memory 62 may be used to store the boundaries of a designated marketing area (DMA). A designated marketing area is a fixed geographic or cartographic area bounded by a closed shape such as a polygon, circle, curved or straight line segments, or the like. The fixed area or closed shape has outer boundaries that do not move on the surface of the earth. As will be shown below, areas may be excluded (island-like) within a closed shape. Although the areas are fixed, they may be, from time to time, redetermined. A key feature is that as the vehicle or mobile device moves, the DMA remains fixed and thus the device may enter into another DMA. Designated marketing area boundaries may be defined by Nielsen and may be pre-programmed into the memory 62 as a number of polygons wherein each point of each side is defined in cartographic coordinates of longitude and latitude and fractions of degrees.

The GPS receiver 52 is capable of providing latitude and longitude to the controller 60. The controller 60 may be used to compare the location signals from the GPS receiver 50, 52 to the boundaries of the designated marketing areas to determine which designated marketing area the mobile device is within and which area it is not within, which signals the system should be receiving. These signals may coincide with or coordinate to the local broadcasting signals for the specific designated marketing area. It should be noted that more than one designated marketing area may be provided for a particular area. That is, adjacent areas may also be authorized for viewing. Various fringe regions may be used around a particular designated marketing area to provide hysteresis for the system. This function will be further described below.

The controller 60 may also be coupled to a user interface 64. User interface 64 may be various types of user interfaces such as a keyboard, push buttons, a touch screen, a voice activated interface, or the like. User interface 64 may be used to select a channel, select various information, change the volume, change the display appearance, or other functions. The user interface 64 is illustrated as part of the mobile receiving unit. However, should the unit be incorporated into a vehicle, the user interface 64 may be located external to the mobile receiving unit such as dial buttons, voice activated system, or the like incorporated into the vehicle and interface with the mobile receiving unit.

An access card 66 may also be incorporated into the mobile receiving unit. Access cards such as a conditional access module (CAM) cards are typically found in DirecTV units. The access card 66 may provide conditional access to various channels and wireless signals generated by the system. Not having an access card or not having an up-to-date access card 66 may prevent the user from receiving or displaying various wireless content from the system.

Figure 3:
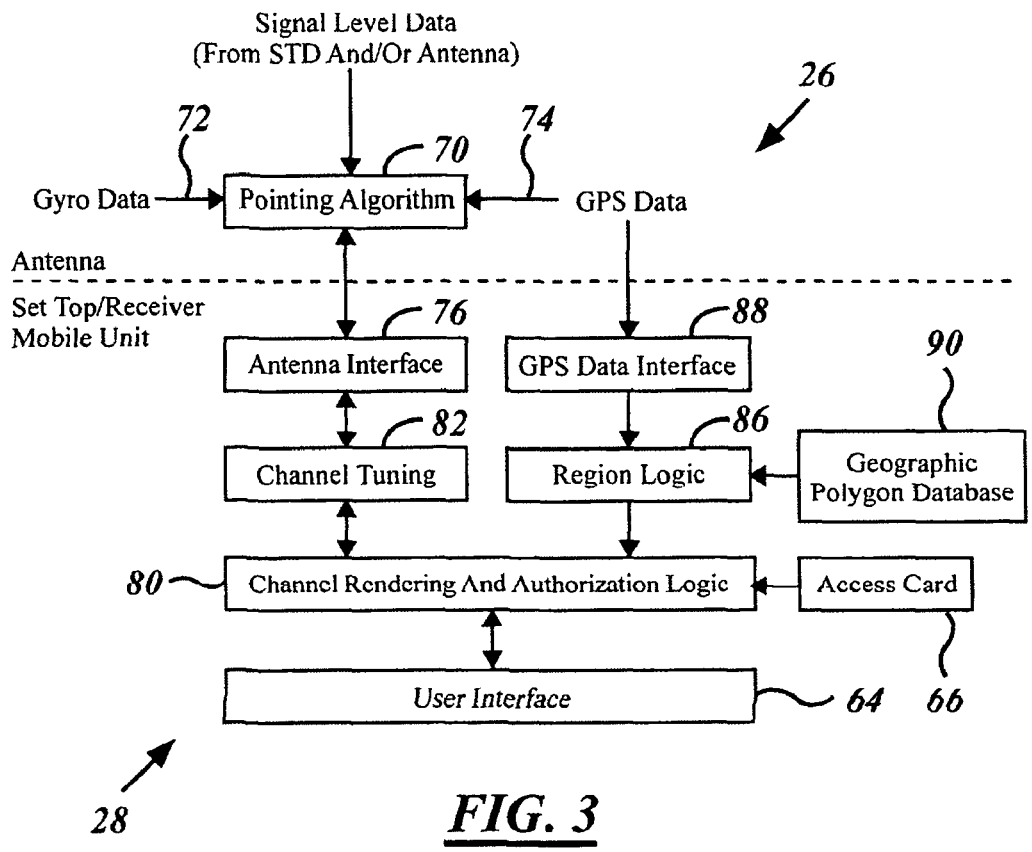
FIG. 3 is a block diagrammatic view of the logic of the antenna and the set top mobile receiving unit.

Referring now to FIG. 3, a block diagrammatic view of the mobile receiving unit 28 and the antenna 26 is illustrated. The boxes here represent the software logic that may be used to implement the invention. Various information may be associated with the antenna 26. The antenna 26 may include a pointing algorithm 70 therein. The pointing algorithm 70 may receive information from gyros in the antenna and be provided as gyro data 72. GPS data 74 may be provided from the GPS or location receiver 50, 52 illustrated above in FIG. 2. Other information may be provided from the mobile receiving unit such as channel tuning information and the like.

The mobile receiving unit 28 may include an antenna interface 76 that is used to communicate with the antenna. The antenna interface 76 formats the signals from the mobile receiving unit. For example, various signal level data such as the channel tuning information may be provided. Data from the user interface 64 and the conditional access card 66 may be used by the channel rendering and authentication logic 80. The channel rendering and authentication logic 80 may authorize the particular user based upon the conditional access card. Information entered from the user interface such as a password may also be used in the authentication logic. Various methods for authentication are well known in the art. The channel rendering portion of the channel rendering and authentication logic 80 receives information from the user interface 64 as to which wireless signals the user would like to receive. The channel rendering and authentication logic 80 generates signals that are provided to the channel tuning logic 82. The channel tuning logic 82 provides channel tuning information based upon the channel rendering information. The channel tuning logic 82 may include a receiver and a decoder used for receiving and decoding the appropriate channels. The channel tuning logic 82 may provide information to the antenna interface 76 such as the direction of the signal or satellite that contains the particular channel that is desired. This information may be used by the pointing algorithm 70 to rotate the antenna in the appropriate direction.

The controller 60 may also include region logic 86. The region logic 86 may provide information to the channel rendering logic as to the particular region that the antenna or the mobile receiving unit is located. The region logic 86 may be coupled to the GPS data interface 88. The GPS data interface 88 provides GPS information to the region logic so that appropriate signals may be received or displayed.

One use of the region logic 86 is that based upon the GPS signals, the location of the receiving unit may be selected. The region logic 86 may then look up in a geographic polygon or location database 90 which designated marketing area the receiving device is located. From this information the appropriate local broadcast channels may be selected. The database 90 may consist of polygon information used to define the marketing areas. The database 90 may also include other information such as zip code information or other ranges of data used for comparison with the signals. As will be evident to those skilled in the art, the wireless signals may be received with various location data used to identify the location appropriate for the signal to be displayed in. For example, the data may include information such as from which local broadcast market the signal originates (e.g., the Washington, D.C. area). The signals may indicate another local broadcast market (e.g., the Baltimore area). When the vehicle or mobile device is in the proper location, the proper signal may be displayed on the mobile device.

The location information may be provided in various portions of the signal. If the signal is an all digital signal the location information may be provided in a preamble of the information packet. If the signal is an analog signal the location data may be included in a vertical blanking interval of an analog television signal or as unused bandwidth of a digital television signal. In a purely analog signal, the location data may be superimposed digitally on the analog signal.

Figure 4A:
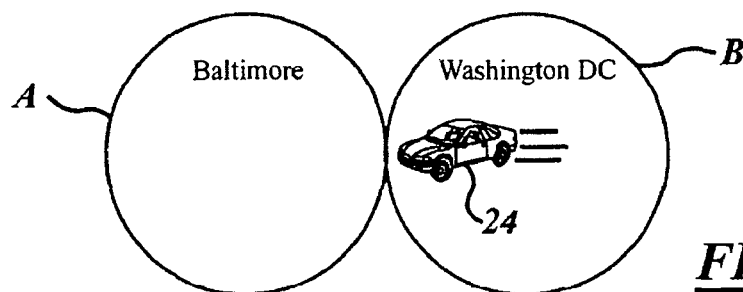
FIGS. 4A-4B are top views of two non-overlapping and adjacent television markets.
Figure 4B:
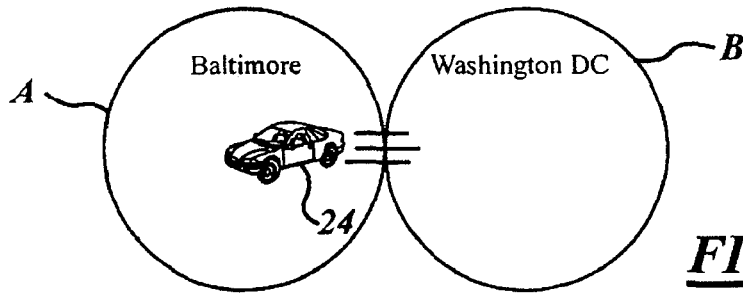

Referring now to FIGS. 4A and 4B, a typical example of a two local adjacent television market areas with non-overlapping areas is illustrated. A first local television market area is set forth as A and is labeled Baltimore and a second local area is set forth as B and is labeled Washington, D.C. A vehicle 24 is in the local market B in FIG. 4A and in local market A in FIG. 4B. In this scenario, the local television market signal is received in area B and will be changed upon crossover of the boundary of the vehicle 24 (or other mobile device) when entering local market area A. Thus, when the vehicle crosses over, the local market area will be changed. For example, if CBS Corporation broadcasts a beam received in local market B, Baltimore's CBS broadcast will be picked up in local market area A. The receiver may thus be tuned automatically to the new local affiliate in the second market.

Figure 5A:
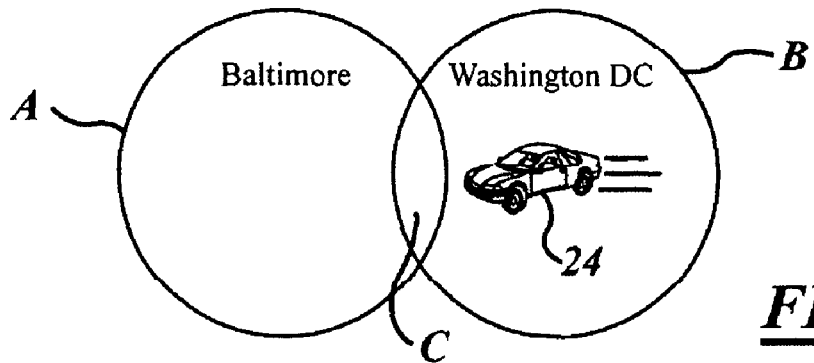
FIGS. 5A-5C are top views of two overlapping television markets.
Figure 5B:
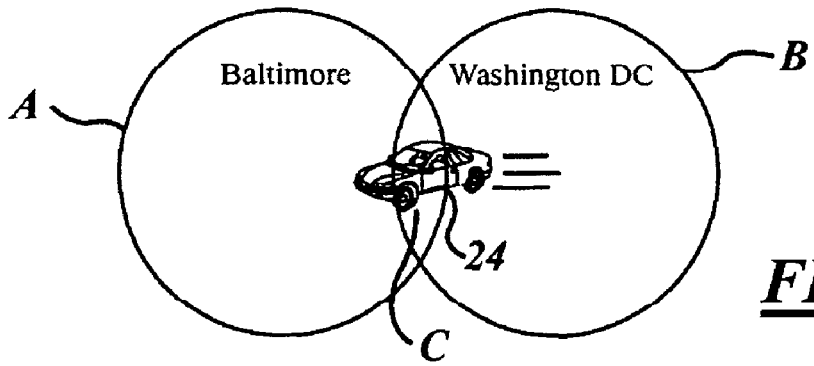
Figure 5C:
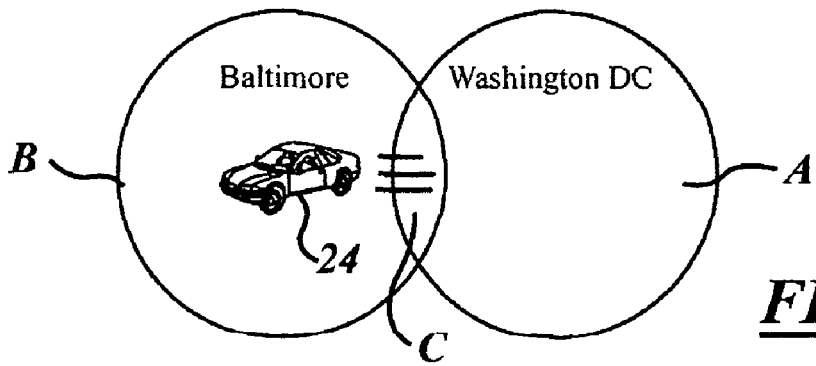

Referring now to FIGS. 5A, 5B and 5C, a vehicle 24 starts in local market area B in FIG. 5A and travels to the overlapping area C between FIGS. 5A and 5B. In overlapping area C, either the local broadcasts of both stations may be legally broadcast to the vehicle. For ease of use, when the vehicle travels to the overlapping area C from local market area B, the local market area B channel or affiliate will be broadcast or displayed on the mobile device within the vehicle 24. In FIG. 5C, once the vehicle leaves the overlapping area C and enters local market area B, the receiver will be retuned to the local market area broadcast for market B. In this manner, in a return trip from local market area B, the local market area broadcasts of B will be displayed in the vehicle 24 until the vehicle 24 crosses the boundary outside of the overlapping area C in local market area A.

Figure 6A:
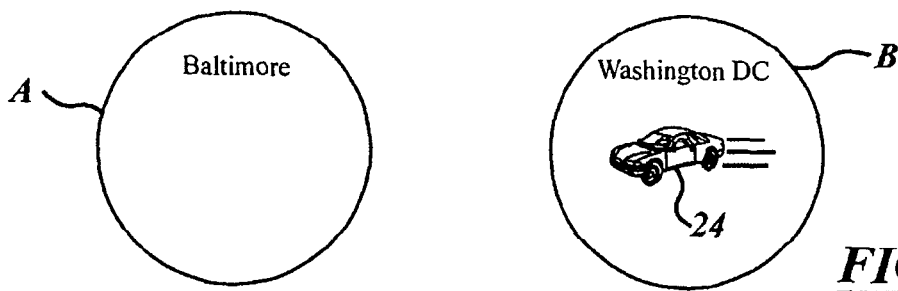
FIGS. 6A-6C are top views of spaced-apart television markets.
Figure 6B:
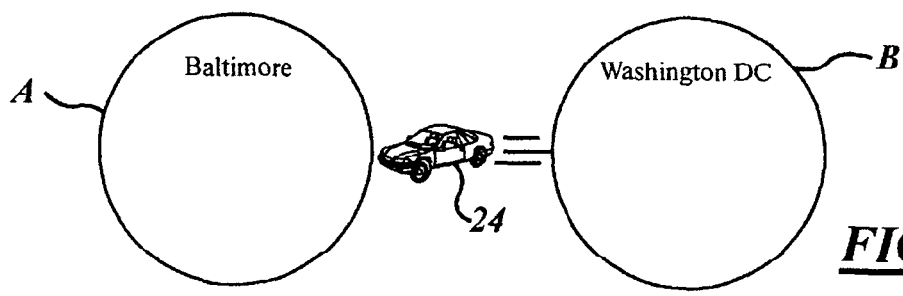
Figure 6C:
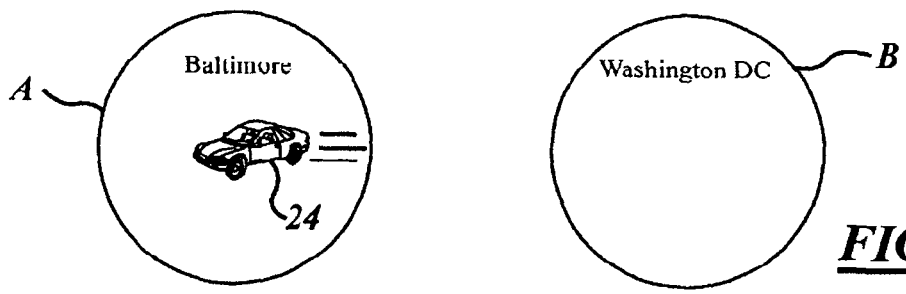

Referring now to FIGS. 6A, 6B and 6C, the local market areas are separated by a distance and thus are not adjacent. In this example, when the vehicle 24 or other mobile device is within local market area B, the local market area channels will be displayed. In FIG. 6B, the vehicle is between two local market areas. Thus, a nationally broadcast network feed may be displayed within the vehicle. When the vehicle enters local market area A in FIG. 6C, the vehicle will display the local network broadcast for local market area A. When the vehicle is in local market area B in FIG. 6A, the local Washington, D.C., CBS affiliate may be broadcast. In FIG. 6B, the national CBS feed may be displayed on the mobile device. In FIG. 6C, the Baltimore affiliate of CBS may be displayed on the mobile device 22.

Figure 7A:
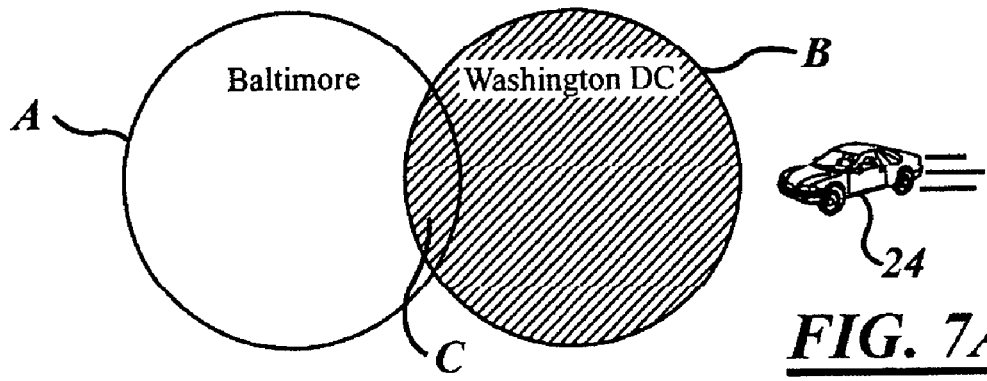
FIGS. 7A-7C are top views of overlapping television markets with one being not available on satellite.
Figure 7B:
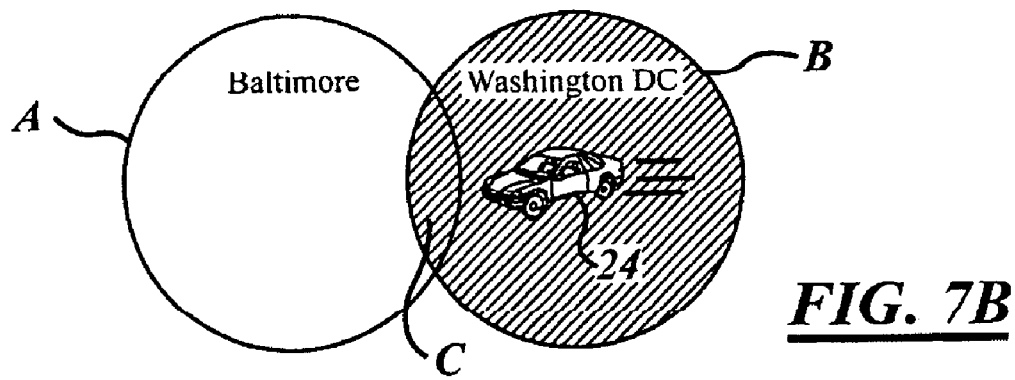
Figure 7C:
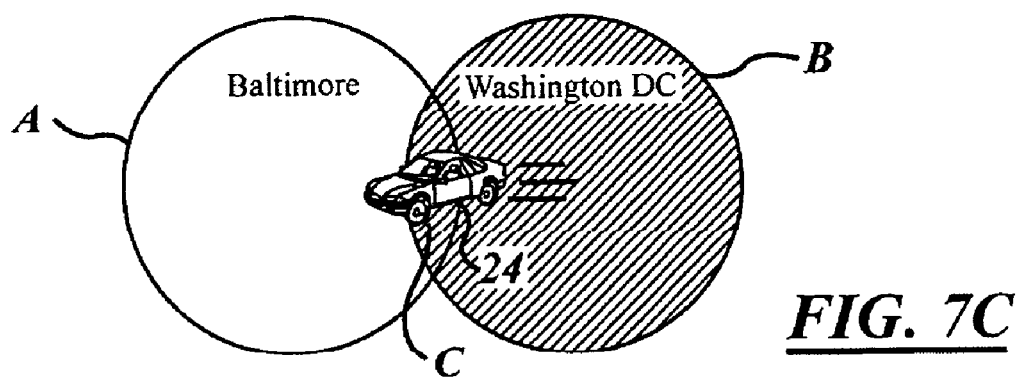

Referring now to FIGS. 7A through 7C, it may be possible a local television market broadcast channel may not be available by satellite due to the provider not offering local service or due to a receiver not being able to receive the broadcast signal. Certain orbital locations may not be easily received by a mobile television receiver. In this example, the local affiliate for the particular network is not available in local network area B. In FIG. 7A, the vehicle 24 is outside any local network area and thus the satellite is tuned to the nationally broadcast network. In FIG. 7B, the vehicle has entered the exclusive network region B. In this example, the satellite receiver blanks both audio and video since the local television market area signal is not available.

In FIG. 7C, once the vehicle reaches the overlap region C, the local television market area may display the local channel from local area A. Thus, carrying forward with the present example in FIG. 7C, once the vehicle enters the overlap region C, the Baltimore area CBS local feed may be broadcast.

Figure 8:
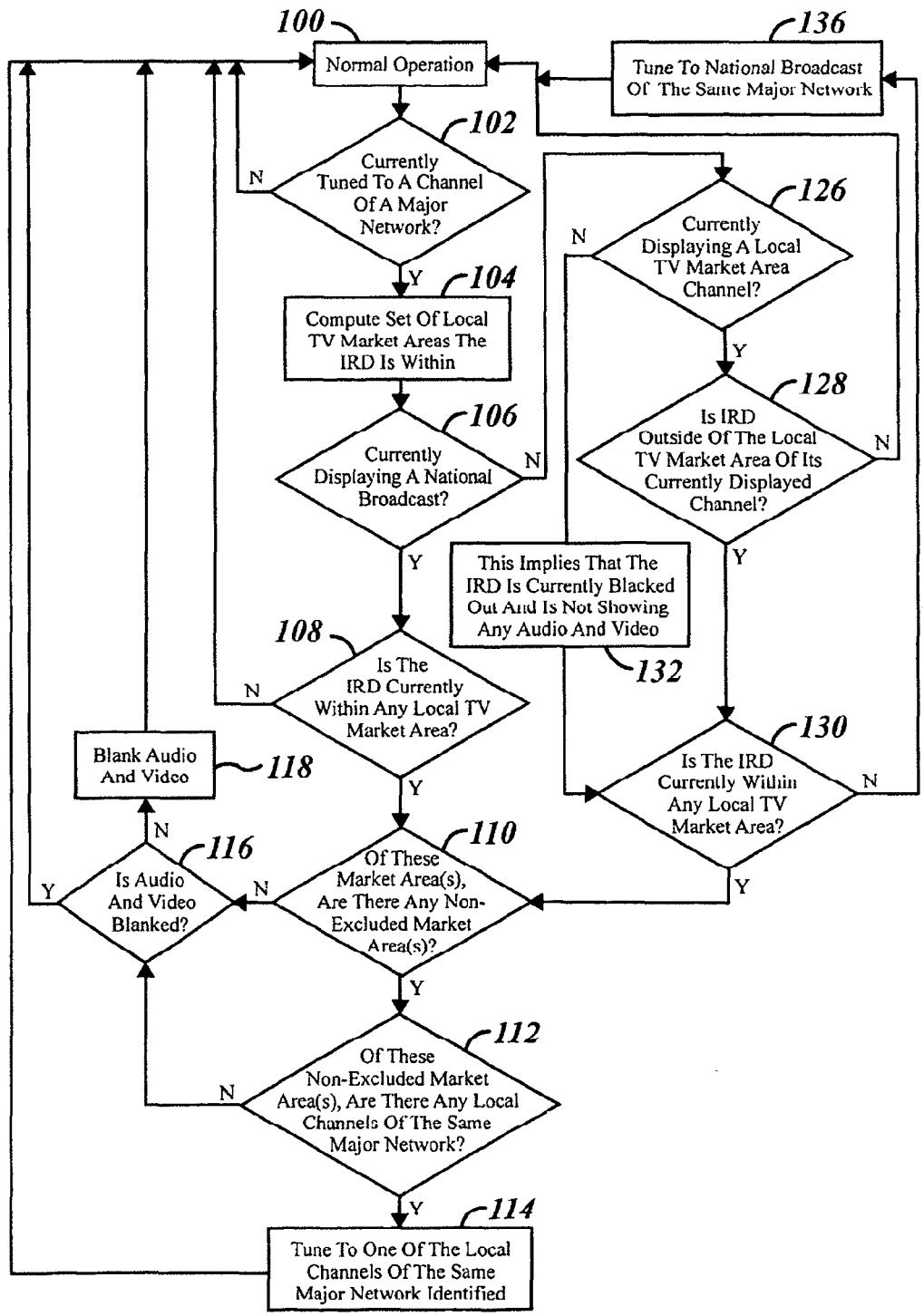
FIG. 8 is a flow chart illustrating one method for operating the present invention.

Referring now to FIG. 8, a method of performing network handoffs is illustrated. Normal operation of the receiver is illustrated in step 100. Normal operation is receiving a broadcast signal. In step 102, it is determined whether the receiver is tuned to a channel of a major network. If the channel is not tuned to a channel of a major network, step 100 is again performed. In step 102, if the channel is tuned to a major network, step 104 is performed. In step 104, the local TV market area or areas are determined or computed. This may be performed within the integrated receiver decoder (IRD) comparing the location of the mobile device to market areas defined within the IRD or the like. In step 106, if the receiving device is displaying a national broadcast, step 108 is performed. In step 108, if the receiving device is currently not within any local television market area, step 100 is again performed. In step 108, if the receiving device is within a local television market area, step 110 is performed. Once the market areas are determined, if there are any non-excluded market areas, step 112 is executed. In step 112 it is determined from the non-excluded market areas if there are any local channels of the same major network. If there are local channels of the same major network in step 112, the receiving device is tuned to one of the local channels of the same major network identified in step 114. After step 114, step 100 is again performed.

Referring back to steps 110 and 112, if there are no non-excluded market areas in step 110 or there are not any local channels of the same major network in step 112, step 116 is executed. In step 116, it is determined whether or not the audio and video are blanked or blocked in the receiving device. If they are being currently blocked in the receiving device, step 100 is executed. If the audio and video are not blanked or blocked in step 116, step 118 blanks or blocks the audio and video on the receiving device so that the channel video may not be displayed and the audio may not be heard.

Referring back to step 106, if a national broadcast is not being displayed, step 126 is performed. In step 126, it is determined whether a local television market area channel is currently being displayed. If the current local television market area channel is being displayed, step 128 is performed. In step 128, if the receiving device is not outside of the local television market area of its currently displayed channel, step 100 is again performed. In step 128, if the IRD is outside of the local television market area of its currently displayed channel, step 130 is executed. Also, referring back to step 126, if the receiving device is currently not displaying a local television market area channel in step 126, step 132 is performed. Step 132 implies that the IRD is currently blacked out and is not showing any audio and video. After step 132, step 130 is performed. In step 130, it is determined whether the IRD is currently within any local television market area. If the receiving device is not within any local television market area, step 136 is performed in which the national broadcast of the same major network is tuned on the receiving device. Referring back to step 130, if the IRD currently is within any local television market area, then step 110 is performed. Thus, as can be seen, the various scenarios set forth in FIGS. 4 through 7 are set forth herein.

Figure 9:
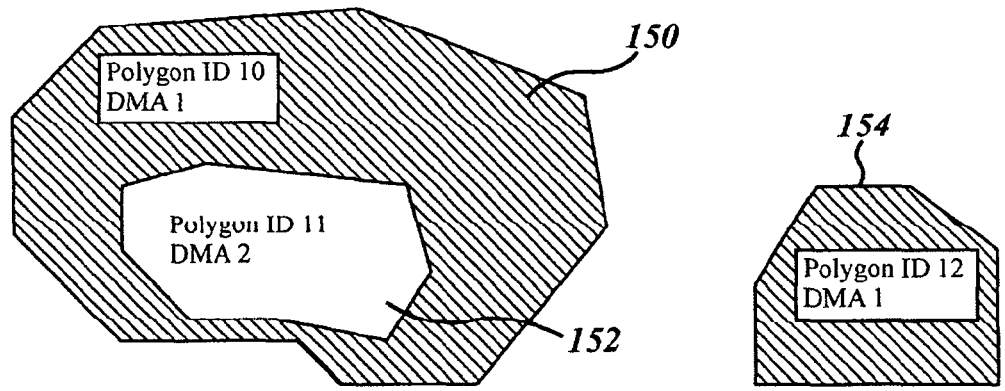
FIG. 9 is a top view of DMA polygons according to the present invention.

Referring now to FIG. 9, determination of the location of the receiving device may be performed in several ways. An example of a complex designated marketing area is shown. These marketing areas may correspond to where local network signals are broadcast or are authorized to be received. A polygon having ID 10 and an assigned market area value of 1 is shown as area 150. Area 152 corresponds to a polygon ID of 11 and an assigned market ID value of 2. Polygon 154 is also of market area 1 and has a polygon ID of 12. It should be noted that each of the polygons are closed polygons. It should also be noted that there is no overlap between Area 152 and Area 150 such that Area 152 is an island inside Area 150. Area 150 taken by itself contains a hole the shape of Area 152. One method for determining a polygon as a set of longitude and latitude points is set forth as:

```
typedef struct {
  polygon id
  number of polygon points
  for (i = 0; i < number of market areas in object; i++) {
    latitude degrees value
    latitude 1/1000 minutes value
    longitude degrees value
    longitude 1/1000 minutes value
} POLYGON_T;
```

The unique polygon ID may be used in a data structure such that the designated marketing area can be a set of unjoined polygons as well as excluded regions as set forth in:

```
typedef struct {
  DMA id
  length of DMA
  number of included regions
  for (i = 0; 1 < number of included regions; i++) {
    polygon Id
  }
  number of excluded regions
  for i = 0; i< number of excluded regions; i ++) {
    polygon id
} DMA T:
```

A representation of the designated marketing area 1 may be illustrated in code as:

| | |
|---|---|
| DMA id | 1 |
| number of included regions | 2 |
| polygon id | 10 |
| polygon id | 12 |
| number of excluded regions | 1 |
| polygon id | 11 |

Referring now to FIGS. 10A-10D, various irregular shaped closed polygons are illustrated as market areas. The mobile device is located at the respective point 180A-180D in each of the various figures, respectively. The polygonal shapes 182A-182E are shown as irregular shapes. When the system is operated, it is not known whether the mobile device is located within or outside of the boundaries. One method for determining this is using a point inclusion detection algorithm. A line is arbitrarily drawn in a direction from the mobile device or point 180 in each of the figures. This is performed using a raycasting technique. In the raycasting the number of intersections with a line is determined Although in FIG. 10 horizontal lines are shown, various other directions may be drawn.

Figure 10A:
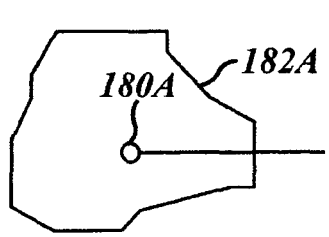
FIGS. 10A-10E are a top view of various polygons for use in a point inclusion detection algorithm.

In FIG. 10A, the number of intersections between the point 180A and the polygon is one. Therefore, any odd numbered amounts correspond to the mobile device being within the designated marketing area.

Figure 10B:
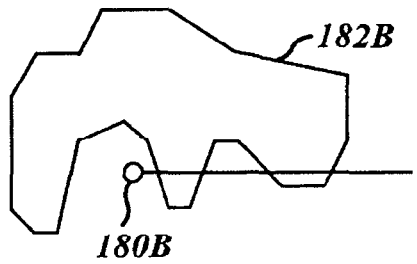

Referring now to FIG. 10B, four intersections of the line from point 180B is illustrated. Thus, a count of the number of intersections is four and thus the point is outside the polygon.

Figure 10C:
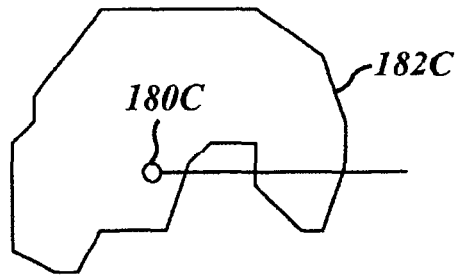

In FIG. 10C, three intersection points are counted. Therefore, the point 180C is within the designated marketing area.

Figure 10D:
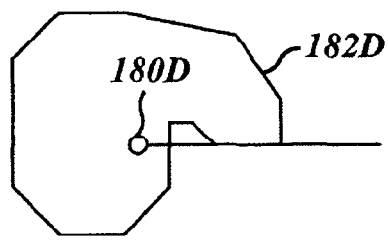

In FIG. 10D, the points of the polygon are on the GPS points line. In this case, all the polygon points should be ignored as intersections and only when the polygon's points have crossed the GPS line should an intersection be counted. In this case, there is just one intersection and the GPS point is therefore inside the polygon because of the odd number.

In summary, an odd number of intersections indicates that a point is within a polygon. An even number of intersections indicates the GPS point is outside the polygon.

Figure 10E:
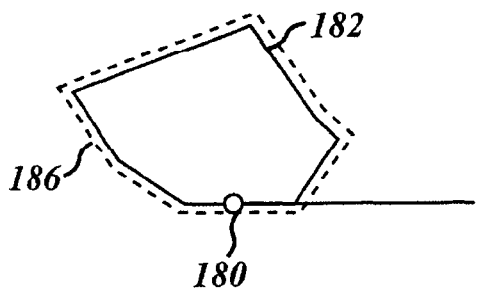

Referring now to FIG. 10E, the GPS point 180E is on the boundary of the designated marketing area polygon. In this case the GPS point will be defined as being inside the polygon. Because the boundary of one DMA is likely to be the boundary of an adjacent DMA, the GPS point 180E may be a member of multiple DMA regions when it lies on the boundary lines between the designated marketing areas. This may be confusing for a system. Therefore, if the mobile device is within the polygon and is moving toward the boundary, hysteresis buffer zone 186 may be provided around the polygon so that not until the vehicle or mobile device leaves the buffer zone 186 would the local channels be changed.

Referring now to FIG. 11, a method for performing a point inclusion detection algorithm is illustrated. In step 200, a line is drawn from a GPS point. In step 202, the number of intersections of the line with the closed polygon is determined. In step 204, if an odd number is counted in step 204, step 216 determines that the system is within the polygon and within the designated marketing area.

Referring back to step 204, if the count is not odd step 208 is executed. In step 204, if the count is even, the system is outside the polygon in step 210. If the count is not even or odd in step 218, step 212 is executed in which it is determined whether or not the system is on a boundary. A boundary system is illustrated in FIG. 10E above. If the system is on a boundary, the system determines whether it is within a polygon in step 214. After both steps 216 and 210 are executed, the controller of the system determines the local signal to receive based upon the designated marketing area. These channels are displayed on the display of the receiving device.

Referring now to FIG. 12, a table illustrating major network category values is illustrated. In the first column an index is set forth for each of the major network channels. The second column represents the major networks. Each of the channels may be broadcast with the identifying index and a number representing the local network affiliate. Thus, from each signal the network and the particular locality from which it originates is broadcast. This information may be used for comparison purposes within the receiving device. Thus, the local descriptor for each major area of the country will be different. For each major network the descriptor index will be the same. As the receiving device moves from a first marketing area to a second marketing area, the proper local descriptor having the same network index value will be chosen.

Referring now to FIG. 13, a method for determining which polygon the location of a device is in may be performed using a quad tree. A quad tree is similar to a binary tree except that each node may have up to four children. In this example, node 250 has four adjacent quadrants 252, 254, 256, and 258. The position of user 260 is compared against the coordinates of the starting reference point 250. Since it is to the northeast of reference point 250, the next reference point 262 is compared against the user's position 260. The next reference point is 270. Because it is a leaf node with no children, it is possible to state that the user 260 is located within the polygon represented by reference point 270 and not the polygons represented by reference points 264, 266, and 268.

Another way in which to determine the reference point is to determine a radius from a specific point within the marketing area. If a receiving device is within the radius, it is within the local marketing area and thus the local network feeds should be displayed as described above.

While particular embodiments of the invention have been shown and described, numerous variations and alternate embodiments will occur to those skilled in the art. Accordingly, it is intended that the invention be limited only in terms of the appended claims.

What is claimed is:

1. A method of operating a mobile device comprising:
   determining a location of the mobile device;
   determining a local television market area for the mobile device in response to the location;
   broadcasting from a satellite a first local television market signal for a first television network in a first market and a second local television market signal for the first television network in a second market; and
   selecting one of the first local television market signal and the second local television market signal in response to the local television market area at the mobile device.

2. The method as recited in claim 1 wherein determining a location comprises determining the location in response to a GPS receiver.

3. The method as recited in claim 1 wherein determining a location comprises determining the location in response to a GPS receiver disposed within an automotive vehicle.

4. The method as recited in claim 1 wherein determining a location comprises determining the location in response to a GPS receiver disposed within the mobile receiving device.

5. The method as recited in claim 1 wherein determining a location comprises determining the location in response to a cellular phone system.

6. The method as recited in claim 1 wherein the mobile receiving device comprises an integrated receiver decoder.

7. The method as recited in claim 1 wherein determining a location comprises determining a coordinate point and wherein determining a local market area comprises determining the local market area in response to the coordinate point.

8. The method as recited in claim 1 wherein determining a local television market area comprises determining the local television market area as a distance from a reference point.

9. The method as recited in claim 1 wherein determining a local television market area comprises determining the local television market area as a distance from a reference point using a quad tree structure.

10. The method as recited in claim 1 wherein determining a local television market area comprises determining the local marketing response to determining a postal code.

11. The method as recited in claim 1 wherein determining a local television market area comprises determining the local television market area using a point inclusion technique.

12. The method as recited in claim 1 wherein selecting comprises determining an overlapping area of the first local television market and second local television market, maintaining the first local market signal until the mobile device is outside of the overlapping area.

13. The method as recited in claim 1 wherein selecting comprises changing a channel in the receiver.

14. The method as recited in claim 1 wherein when no local market area exists, tuning to a national network satellite feed.

15. A method of operating a mobile device comprising:
    determining a local television market for the mobile device;
    determining, at the mobile device, a local television channel is present but not carried by a satellite;
    when a local satellite channel corresponding to the local television channel does not exist in the local television market but the local television channel is present in the local television market, blocking a network feed corresponding to the local television channel from the satellite in the mobile device.

16. The method as recited in claim 15 wherein blocking a network feed comprises blocking the network feed when a second local television market and a second satellite signal are not present.

17. The method as recited in claim 15 further comprising determining a location and wherein determining the local television market comprises determining the local television market in response to the location.

18. The method as recited in claim 15 wherein determining a location comprises determining the location in response to a GPS receiver.

19. The method as recited in claim 15 wherein determining a location comprises determining the location in response to a GPS receiver disposed within an automotive vehicle.

20. The method as recited in claim 15 wherein determining a location comprises determining the location in response to a GPS receiver disposed within the mobile receiving device.

21. The method as recited in claim 15 wherein determining a location comprises determining the location in response to a cellular phone system.

22. The method as recited in claim 15 wherein determining a location comprises determining a coordinate point and wherein determining a designated marketing area comprises determining the designated marketing area in response to the coordinate point.

23. The method as recited in claim 15 wherein the mobile receiving device comprises an integrated receiver decoder.

24. A method of operating a mobile device comprising:
defining a first area corresponding to a first local television market, a second area corresponding to a second local television market and an overlapping area of the first local television market and the second local television market;
moving the mobile device into a first area outside the overlapping area;
tuning the mobile device to a first local television market signal;
moving the mobile device to the overlapping area from the first area;
maintaining the tuning of the mobile device to the first local television market signal after moving into the overlapping area;
moving the mobile device from the overlapping area into the second area outside the overlapping area; and
when the mobile device is in the second area outside the overlapping area, tuning the device to a second local television market signal.

25. The method as recited in claim 24 further comprising broadcasting the first local television market signal and the second local television market signal from a satellite.

26. A method of operating a receiving device comprising:
determining whether the receiving device is tuned to a major network on a satellite channel;
determining a location of the receiving device;
determining at least one local market area of the receiving device in response to the location;
determining whether the receiving device is tuned to a national broadcast of the major network; and
when the receiving device is tuned to a national broadcast and the receiving device moves, tuning to a second channel corresponding to the second local market area for the major network.

27. The method as recited in claim 26 wherein determining whether the receiving device is tuned to a major network is performed in response to a broadcast network code.

28. The method as recited in claim 26 wherein the receiving device comprises a mobile phone.

29. The method as recited in claim 26 wherein the receiving device comprises a personal electronic device.

30. The method as recited in claim 26 wherein determining a location comprises determining the location in response to a GPS receiver.

31. The method as recited in claim 26 wherein determining a location comprises determining the location in response to a GPS receiver disposed within an automotive vehicle.

32. The method as recited in claim 26 wherein determining a location comprises determining the location in response to a GPS receiver disposed within the mobile receiving device.

33. The method as recited in claim 26 wherein determining a location comprises determining the location in response to a cellular phone system.

34. The method as recited in claim 26 wherein the mobile receiving device comprises an integrated receiver decoder.

35. The method as recited in claim 26 wherein determining a location comprises determining a coordinate point and wherein determining at least one local market area comprises determining the at least one local market area in response to the coordinate point.

* * * * *